A. BERGNE

ARRANGEMENT FOR SOUND RECORDING AND REPRODUCTION FROM A MAGNETIZABLE DISK

Filed April 27, 1955

INVENTOR

ARNE BERGNE,

BY Larson and Whitney

ATTORNEYS

United States Patent Office
2,810,581
Patented Oct. 22, 1957

2,810,581

ARRANGEMENT FOR SOUND RECORDING AND REPRODUCTION FROM A MAGNETIZABLE DISK

Arne Bergne, Lidingo, Sweden, assignor to Svenska Aktiebolaget Gasaccumulator, Lidingo, Sweden, a corporation of Sweden Application April 27, 1955, Serial No. 504,331

2 Claims. (Cl. 274—4)

Figure 1:
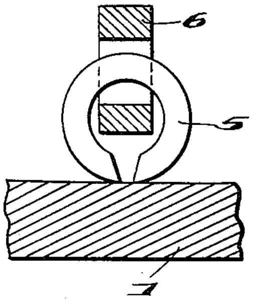
Figure 2:
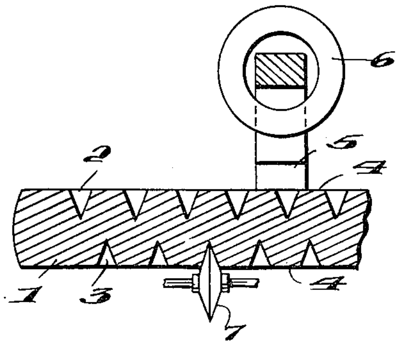

In sound recording on and reproduction from a magnetizable disk, the disk may be arranged rotatable about a fixed or a radially displaceable centre. The disk cooperates with a recording head, which is in the first case radially displaceable and in the second case fixed, a portion of the head being normally in contact with the disk and being guided to follow a spiral groove on the disk surface. Various means can be used for guiding the head along the spiral groove. For instance, the disk may be provided with guiding grooves on both sides, and the guiding groove on one side may be used for determining the form of the recording groove either on the same or on the opposite side of the disk. The form of the recording groove may also be decided by a thread cooperating with a nut or the like, which is adapted during the rotation of the thread in synchronism with the disk to control the radial feeding of the recording head.

The present invention refers to an arrangement of the first mentioned type, in which a disk is used, which is provided with guiding grooves on both sides. According to the invention, the portion of the disk contiguous to the recording head has a width which is equal to the groove spacing. On the assumption that the active magnetizable layer is essentially on the flat surface of the disk, half the face of the recording head contiguous to the disk will then be continually operative, irrespective of whether the recording head moves along a spiral parallel to the guiding grooves on the same side or along a spiral which continually cuts across the guiding grooves.

On the annexed drawing is shown a section of a disk according to the invention and a magnetic head cooperating therewith. The disk, which is designated by 1 on the drawing, is provided on one side with a spiral-shaped guiding groove 2 and on the other side with a spiral-shaped groove 3. These grooves may be arranged in such a way that the guiding groove 2 forms a spiral running clockwise centrewards, whereas the guiding groove 3 forms a spiral running counter-clockwise centrewards. If the disk were made of completely transparent material, the grooves would then appear to run parallel. However, it would also be possible to construct a disk in which the guiding groove 2 as well as the guiding groove 3 forms a spiral running clockwise centrewards. On the assumption that the disk were transparent, the grooves would in that case appear to cross continually. A disk constructed according to the first mentioned method will be referred to in the following as a parallel-grooved disk and a disk according to the last mentioned method will be referred to as a cross-grooved disk.

The portion of the magnetic layer that is operative during the recording and reproducing processes is assumed to be located essentially on the flat portion 4 of the disk between the different turns of the guiding grooves. It is however also possible for the magnetic layer to descend into the guiding grooves proper but these portions of the layer are not likely to contribute essentially to the recording or the reproducing. The flat portion 4 is suitably of a dimension equal to half the groove spacing.

The recording head comprises a magnetic core 5, which is surrounded by a winding 6, to which is appiled during the recording process an audio and possibly also a high frequency and from which the audio frequency is taken off in the reproduction process. The portion of the magnetic core 5 nearest to the disk, which portion may be in direct contact therewith, is beveled in the usual manner adjacent the air gap of the core. The magnetic core is dimensioned so as to have the radial width with regard to the disk of the same magnitude as the groove spacing, i. e. the radial distance between two similarly positioned parts of two adjacent guiding grooves. This ensures that during the motion of the recording head across the disk there will always be a portion of the magnetic layer of approximately constant magnitude directly beneath the recording head. This avoids any audible variations in sound volume if, during its movement over the disk, the recording head should cross over some of the guiding grooves. However, the width of the recording head must not exceed the groove spacing, since in such case crosstalk between adjacent grooves will occur. The width of the recording head should then differ from the groove spacing by an amount determined in view of the risk of crosstalk from adjacent grooves.

The mutual movement of the recording head and the disk can be controlled in such a way that a guide wheel 7 coupled with the recording head runs in a guiding groove on the underside of the disk, the recording head running at the same time in a recording groove on the upper side. Whether the guiding grooves on both sides are parallel or in crossed arrangement, a satisfactory record will thus be obtained without amplitude variations owing to the guiding grooves on the same side as the recording head.

If the disk is provided with guiding grooves on both sides and these are parallel, they may be arranged opposite each other on each side of the disk. However, they are suitably displaced in a radial direction as indicated on the drawing. This gives added strength and break-resistance to the disk.

What is claimed is:

1. A magnetic recording or reproducing system comprising a rotatable and magnetizable disk, spiral grooves on both sides of said disk, flat areas in a common plane on the surface of said disk between said grooves, a recording head whose radial width is equal to the radial distance between corresponding points on two of said adjacent grooves, whereby the surface area of contact between the disk and recording head is unvarying and independent of the position of the head relative to the groove.

2. A magnetic recording or reproducing system as claimed in claim 1, and further comprising a guiding means for said recording head disposed on the opposite side of said disk relative to the head and following one of said spiral grooves.

References Cited in the file of this patent

UNITED STATES PATENTS

| | | |
|---|---|---|
| 1,862,800 | Otten | June 14, 1932 |
| 2,361,752 | Eilenberger | Oct. 31, 1944 |
| 2,535,495 | James | Dec. 26, 1950 |
| 2,537,657 | D'Humy | Jan. 9, 1951 |
| 2,581,765 | Mann | Jan. 8, 1952 |